(12) United States Patent
Huh

(10) Patent No.: US 9,977,594 B2
(45) Date of Patent: May 22, 2018

(54) KEYBOARD HAVING TOUCH SCREEN MOUNTED THEREON, CONTROL METHOD THEREFOR, AND METHOD FOR CONTROLLING COMPUTING DEVICE USING KEYBOARD

(71) Applicant: Yoon Suk Huh, Yangju-si (KR)

(72) Inventor: Yoon Suk Huh, Yangju-si (KR)

( * ) Notice: Subject to any disclaimer, the term of this patent is extended or adjusted under 35 U.S.C. 154(b) by 0 days. days.

(21) Appl. No.: 14/894,100

(22) PCT Filed: Dec. 15, 2014

(86) PCT No.: PCT/KR2014/012371
§ 371 (c)(1),
(2) Date: Nov. 25, 2015

(87) PCT Pub. No.: WO2015/088298
PCT Pub. Date: Jun. 18, 2015

(65) Prior Publication Data
US 2016/0103610 A1 Apr. 14, 2016

(30) Foreign Application Priority Data
Dec. 13, 2013 (KR) .......................... 10-2013-0155798

(51) Int. Cl.
*G09G 5/00* (2006.01)
*G06F 3/0488* (2013.01)
(Continued)

(52) U.S. Cl.
CPC ........ *G06F 3/04886* (2013.01); *G06F 1/1632* (2013.01); *G06F 3/021* (2013.01); *G06F 3/0219* (2013.01); *G06F 3/14* (2013.01)

(58) Field of Classification Search
CPC ...... G06F 3/04886; G06F 3/041; G06F 3/147; G06F 3/04897; G06F 3/04847; G06F 3/04883; G06F 2203/04803
(Continued)

(56) References Cited

U.S. PATENT DOCUMENTS 7,561,146 B1 * 7/2009 Hotelling .............. G06F 3/0304
  345/168
8,023,262 B2 * 9/2011 Ligtenberg ............ G06F 1/1616
  345/157
(Continued)

FOREIGN PATENT DOCUMENTS

KR   10-0896129 B1    5/2009
KR     100896129 B1   5/2009
KR   10-2010-0055092 A  5/2010

OTHER PUBLICATIONS

International Search Report for PCT/KR2014/012371 dated Jan. 26, 2015 [PCT/ISA/210].
(Continued)

*Primary Examiner* — Jennifer Nguyen
(74) *Attorney, Agent, or Firm* — Sughrue Mion, PLLC

(57) ABSTRACT

The present disclosure provides a keyboard having a touch screen mounted thereon. A keyboard according to the present disclosure comprises: a key button unit comprising a plurality of key buttons; a touch screen unit comprising at least one touch screen installed at the lower end of the key button unit; a sensing means for sensing whether the key button unit is being used; and a keyboard control unit for sending signals inputted through the key button unit and the touch screen unit to a computer device, and interworking with the sensing means to control input or output of the touch screen unit, wherein the keyboard control unit controls a screen displayed on the touch screen unit to be displayed on a display of the computer device when the sensing means senses that the key button unit is being used.

According to the present disclosure, a touch screen mounted on the keyboard is used as an auxiliary input device and an auxiliary display of a computer. Therefore, the present disclosure can provide a more convenient I/O interface to a user, thereby enabling the user to use a multi-tasking function of the computer more easily and variously.

11 Claims, 11 Drawing Sheets

(51) Int. Cl.
*G06F 3/14* (2006.01)
*G06F 1/16* (2006.01)
*G06F 3/02* (2006.01)

(58) Field of Classification Search
USPC .................. 345/168, 173–178, 901, 1.1, 1.2
See application file for complete search history.

(56) References Cited

U.S. PATENT DOCUMENTS

| | | | | |
|---|---|---|---|---|
| 2002/0191029 | A1* | 12/2002 | Gillespie | G06F 3/04817 |
| | | | | 715/810 |
| 2006/0132447 | A1* | 6/2006 | Conrad | G06F 3/0219 |
| | | | | 345/168 |
| 2008/0270899 | A1* | 10/2008 | Duncan | G06F 1/1616 |
| | | | | 715/700 |
| 2010/0020019 | A1* | 1/2010 | Liu | G06F 3/023 |
| | | | | 345/169 |
| 2010/0125196 | A1 | 5/2010 | Park et al. | |
| 2011/0047459 | A1* | 2/2011 | Van Der Westhuizen | G06F 1/1692 |
| | | | | 715/702 |
| 2012/0113009 | A1* | 5/2012 | Hotelling | G06F 1/1616 |
| | | | | 345/168 |

OTHER PUBLICATIONS

Written Opinion for PCT/KR2014/012371 dated Jan. 26, 2015 [PCT/ISA/237].

* cited by examiner

KEYBOARD HAVING TOUCH SCREEN MOUNTED THEREON, CONTROL METHOD THEREFOR, AND METHOD FOR CONTROLLING COMPUTING DEVICE USING KEYBOARD

CROSS REFERENCE TO RELATED APPLICATIONS

This application is a National Stage of International Application No. PCT/KR2014/012371, filed on Dec. 15, 2014, which claims priority from Korean Patent Application No. 10-2013-0155798, filed on Dec. 13, 2013, the contents of all of which are incorporated herein by reference in their entirety.

TECHNICAL FIELD

The present disclosure relates to a keyboard and method of controlling a computer device by using the keyboard, and more particularly to the keyboard having a touch screen at the lower end of a key button area and method of controlling a computer device by using the keyboard.

BACKGROUND ART

Typically, a computer displays information through a display by executing a program in accordance with inputted commands.

In addition, because computers support multitasking now, users may simultaneously execute a plurality of programs, and thus carry out various tasks including accessing the Internet, or playing multimedia files, for example, music or video, while editing a document.

By the way, since most computers are connected to just one display, it is hard for users to check information about a plurality of executed programs instantly.

Although this disadvantage may be solved somewhat by using multiple monitors, it is very uncommon to use three or more monitors simultaneously for a computer because of limited spaces and high costs.

In addition, users of most computers click icons displayed on the status bar in the background or at the bottom of the screen to execute programs or check information related to hardware and software.

By the way, since the background icons are not visible in an editing window, it is necessary to move from the editing window to the background to execute a required program or check the information. In addition, icons displayed on the status bar are too small and thus not conspicuous, and it is thus hard to check required information instantly.

Meanwhile, although a keyboard is most frequently used and touched by users and an essential input device of a computer, it does not have other function than input, and not used if there is no input activity.

Multi-functional keyboards with various functions in addition to the input function have been studied to address the issue.

For example, the keyboard disclosed in Korea Utility Model Registration No. 20-0420313 is installed with an LCD (Liquid Crystal Display), displays characters corresponding to the pressed key buttons on the LCD in real time to enable users to identify typing errors or wrong entries quickly through the LCD without seeing their monitor.

By the way, since the LCD of the keyboard disclosed in the aforementioned Utility Model Registration is used just for displaying characters corresponding to key buttons, it is still not used if there is no input activity, and does not enable users to check computer hardware information and program execution information.

DISCLOSURE

Technical Problem

In view of the above, the present disclosure provides a computer user with a more diversified GUI environment and a more convenient I/O interface to solve the aforementioned problems.

In addition, the present disclosure provides a keyboard typically used just as an input device with an I/O interface interworking with multitasking of a computer to increase added values of a keyboard and enhance user's convenience in an environment for using computers which is more complicated day by day.

Technical Solution

An embodiment of the present disclosure provides a keyboard having a key button unit including a plurality of key buttons; a touch screen unit including at least one touch screen installed at the lower end of the key button unit; a sensing means for sensing whether the key button unit is being used; and a keyboard control unit for sending signals inputted through the key button unit and the touch screen unit to a computer device, and interworking with the sensing means to control input or output of the touch screen unit, wherein the keyboard control unit controls the screen displayed on the touch screen unit to be displayed on the display of the computer device when the sensing means senses that the key button unit is being used.

In the keyboard in accordance with an embodiment of the present disclosure, the touch screen unit includes a plurality of screen areas controlled independently each other, and the keyboard control unit controls the screen displayed in a screen area part or all of which is covered by using the key button unit among the plurality of screen areas to be displayed on the display of the computer device.

In addition, in the keyboard in accordance with an embodiment of the present disclosure, the sensing means is a proximity sensor installed between the key button unit and the touch screen unit in the horizontal direction.

In addition, in the keyboard in accordance with an embodiment of the present disclosure, the touch screen unit includes a plurality of screen areas, and a plurality of the sensing means are installed to correspond to the plurality of screen areas.

In addition, in the keyboard in accordance with an embodiment of the present disclosure, light emitting units for status display are formed close to the touch screen unit to show the operation status of a corresponding touch screen.

In addition, in the keyboard in accordance with an embodiment of the present disclosure, the touch screen operates in any one mode selected from a plurality of operation modes, and the plurality of operation modes include at least two modes selected from: status display mode for displaying the status of a connected computer device; shortcut icon mode for displaying a plurality of execution icons; touch pad mode for sensing user's touch to carry out the functions of a pointing device and an input device; and widget mode for displaying information provided through the Internet network.

In addition, another embodiment of the present disclosure provides a method of controlling operation of a keyboard having: a key button unit including a plurality of key buttons; a touch screen unit including at least one touch screen installed at the lower end of the key button unit; a sensing means for sensing whether the key button unit is being used; and a keyboard control unit for sending signals inputted through the key button unit and the touch screen unit to a computer device, and interworking with the sensing means to control input or output of the touch screen unit. The method includes driving the touch screen unit; deciding whether the key button unit is being used; and controlling the screen displayed on the touch screen unit to be displayed on the display of the computer device when it is decided that the key button unit is being used.

In the method in accordance with the present disclosure, said deciding whether the key button unit is being used is to decide that the key button unit is being used when a proximity sensor installed between the key button unit and the touch screen unit senses user's hands.

In the method in accordance with the present disclosure, said deciding whether the key button unit is being used is to decide that the key button is being used when a touch area on the touch screen is larger than a reference touch area.

Another embodiment of the present disclosure provides a method of controlling operation of a computer device by using a keyboard having: a key button unit including a plurality of key buttons; a touch screen unit including at least one touch screen installed at the lower end of the key button unit; and a keyboard control unit for sending signals inputted through the touch screen unit to the computer device. The method includes setting the touch screen unit to be in touch pad mode; recognizing a pattern inputted by user's hands in the touch screen set to be in the touch pad mode; deciding whether the pattern is a registered command by comparing the pattern with the information registered in advance; sending the command to the computer device if the command is decided to match a registered command; executing a program corresponding to the command by the computer device; and displaying a screen of executing the program on the display of the computer device or the touch screen.

Another embodiment of the present disclosure provides a method of controlling operation of a computer device by using a keyboard having: a key button unit including a plurality of key buttons; a touch screen unit including at least one touch screen installed at the lower end of the key button unit; and a keyboard control unit for sending signals inputted through the touch screen unit to the computer device. The method includes recognizing input through the touch screen; sending the input to the computer device; and switching the computer device from standby mode to operation mode if the input matches the information registered in advance. In this case, the input is of characters, numbers, symbols or signature.

Another embodiment of the present disclosure provides a method of controlling operation of a computer device by using a keyboard having: a key button unit including a plurality of key buttons; a touch screen unit including at least one touch screen installed at the lower end of the key button unit; and a keyboard control unit for sending signals inputted through the touch screen unit to the computer device. The method includes recognizing the operation of touch and drag from bottom to top or top to bottom on the touch screen; in said recognizing the operation of touch and drag, sending the screen data displayed on the touch screen to the computer device by the keyboard control unit and displaying the data on a computer display when the operation of touch and drag from bottom to top is recognized, and receiving the screen data displayed on the computer display from the computer device and displaying the data on the touch screen when the operation of touch and drag from top to bottom is recognized.

The foregoing summary is illustrative only and is not intended to be in any way limiting. In addition to the illustrative aspects, embodiments, and features described above, further aspects, embodiments, and features will become apparent by reference to the drawings and the following detailed description.

Advantageous Effects

As described above, since the touch screen mounted on the keyboard in accordance with the present disclosure is used as an auxiliary input device and an auxiliary display of a computer, users are provided with a more convenient I/O interface, to further facilitate and use multitasking of a computer more easily and variously.

Figure 1:
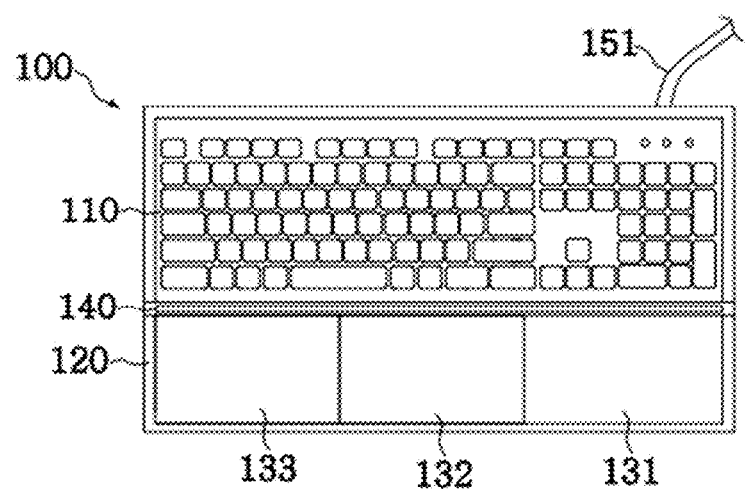
FIG. 1 shows a keyboard in accordance with an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

BEST MODE

The embodiments of the present disclosure will now be described in detail with reference to accompanying drawings.

Figure 2:
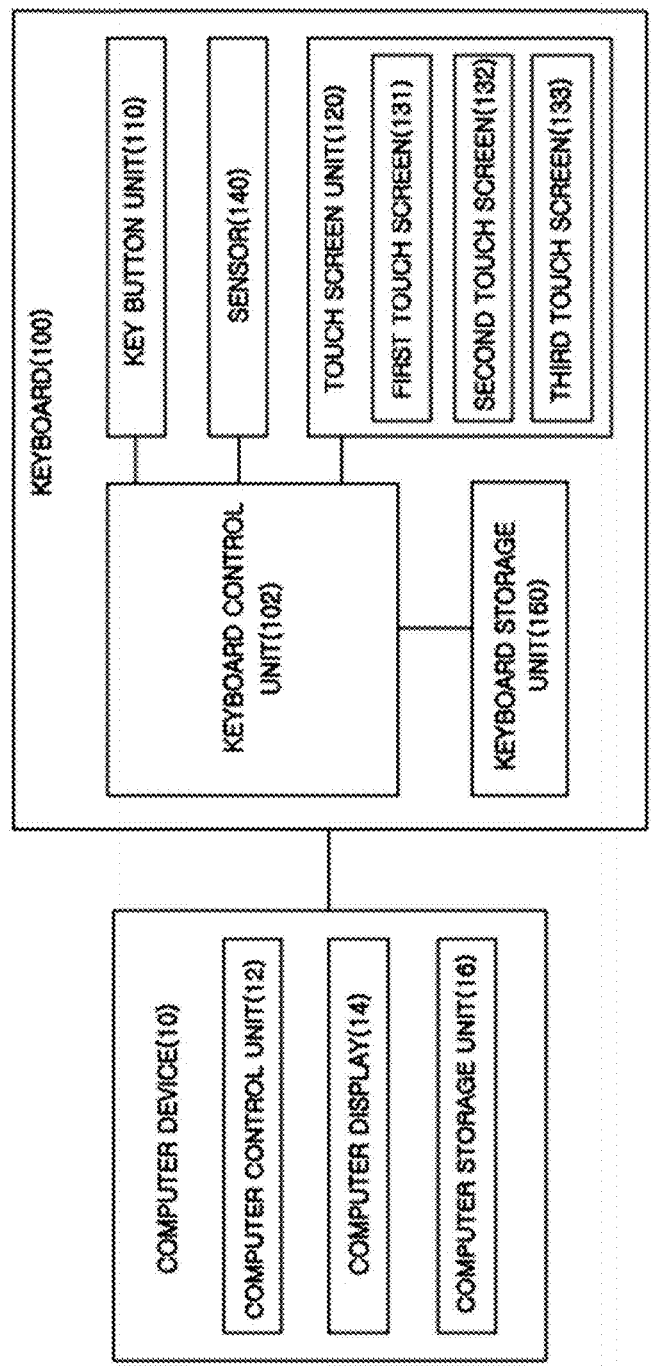
FIG. 2 shows a block diagram of a keyboard and a computer in accordance with an embodiment of the present disclosure.
Figure 3:
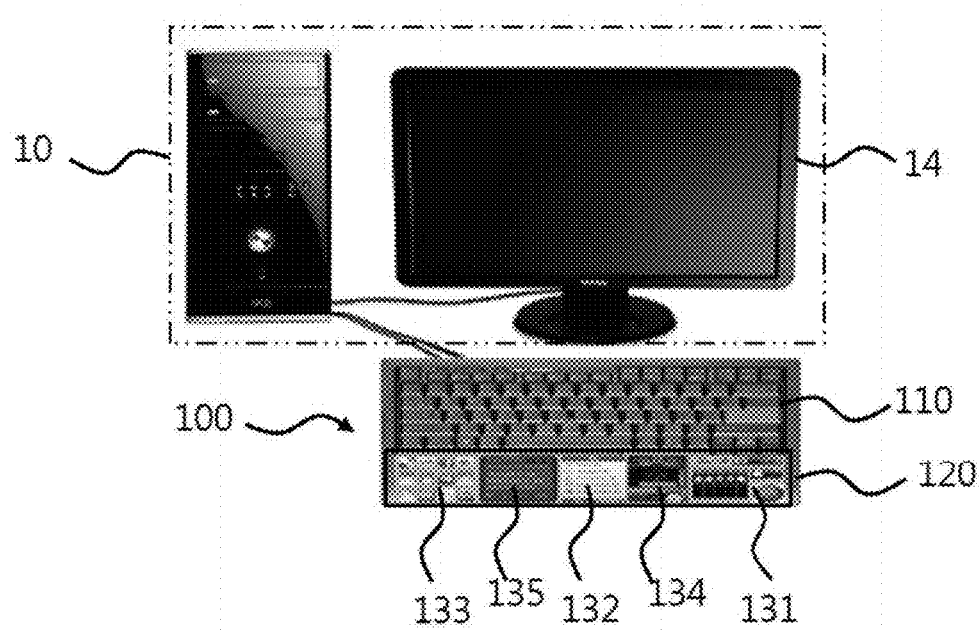
FIG. 3 illustrates a connection of a keyboard to a computer in accordance with an embodiment of the present disclosure.

FIG. 1 is a top view showing a keyboard 100 in accordance with an embodiment of the present disclosure. FIG. 2 is a block diagram showing a configuration of connecting the keyboard 100 to a computer device 10. FIG. 3 illustrates the keyboard 100 connected to and used with the computer device 10.

The keyboard 100 in accordance with an embodiment of the present disclosure includes a key button unit 110 having a plurality of key buttons, a touch screen unit 120 laid out in the horizontal direction at the lower end of the key button unit 110, a keyboard control unit 102 for creating and sending signals in conformity with the operation of the key button unit 110 or the touch screen unit 120 to a computer device 10, a sensor 140 installed between the key button unit 110 and the touch screen unit 120 to sense user's hands, and a keyboard storage unit 160 for storing programs required for operating the keyboard control unit 102.

The specific configuration and operation of the key button unit 110 is equivalent to that of an ordinary keyboard.

It is preferred that the touch screen unit 120 has a plurality of touch screens laid out in a line in the horizontal direction. To this end, the plurality of touch screens independent each other may be mounted on the touch screen unit 120, or one touch screen may be mounted and then divided into a plurality of screen areas.

Hereinafter, whichever case the present disclosure is, for example, installing a plurality of touch screens or dividing one touch screen into a plurality of screen areas, each screen area unit is referred to as a first touch screen 131, a second touch screen 132, and a third touch screen 133, based on the unit of a screen area which independently operates.

Figure 7:
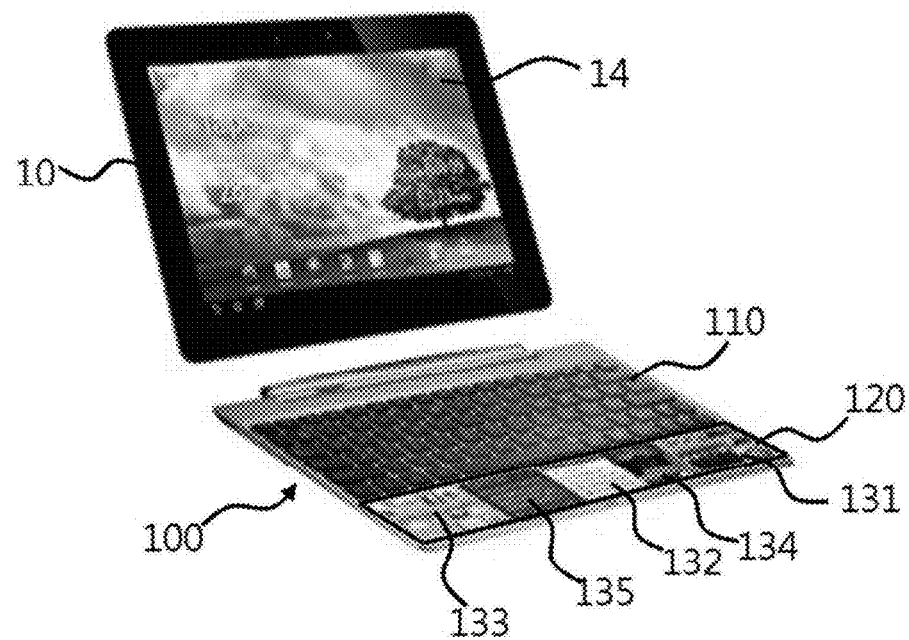
FIG. 7 illustrates a keyboard connected to a portable computer device in accordance with another embodiment of the present disclosure.

In addition, although FIGS. 3 and 7 show the touch screen unit 120 installed with first to fifth touch screens 131, 132, 133, 134 and 135, it is assumed hereinafter that three touch screens 131, 132 and 133 are laid out in the touch screen unit 120 for convenient description.

Figure 4:
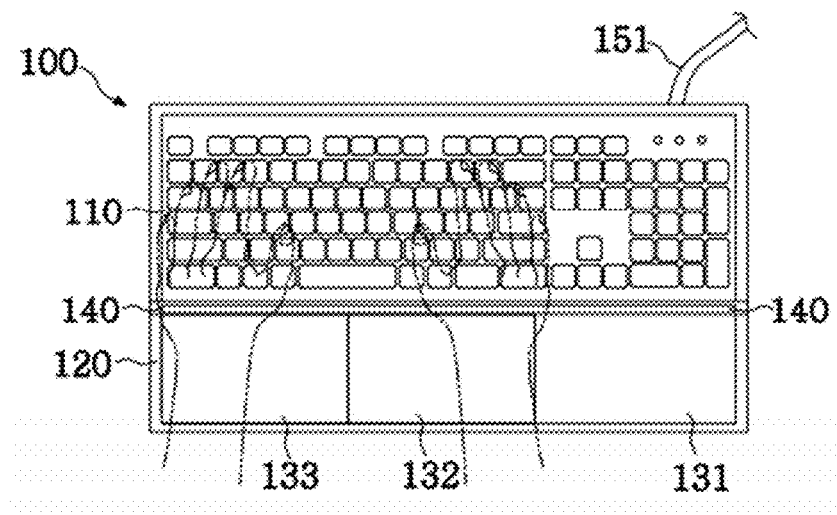
FIG. 4 illustrates a status of using a keyboard in accordance with an embodiment of the present disclosure.

As shown in FIG. 4 for using three touch screens 131, 132 and 133, it is preferred to set the first touch screen 131 as a main touch screen, which is located well visible (for example, the lower end of the number pad) while operating the key buttons, the second and the third touch screens 132 and 133 located at the lower end of the character buttons and covered by user's hands while using the key buttons as auxiliary touch screens 132 and 133 to operate selectively depending on whether the key buttons are being used.

However, since the present disclosure is not limited to the aforementioned configuration, it is allowed to set other touch screens than the first touch screen 131 as a main screen, and a main screen may not specially be specified.

Each of the touch screens 131, 132 and 133 implements various functions and operations by interworking with the keyboard control unit 102 and the computer control unit 12.

For example, information of the computer device 10 may be displayed on at least one of the touch screens 131, 132 and 133, and the information displayed on each of the touch screens 131, 132 and 133 may be displayed on the computer display 14. In addition, commands inputted through each of the touch screens 131, 132 and 133 may be executed on the computer display 14.

Therefore, the first to the third touch screens 131, 132 and 133 function as an auxiliary display for displaying status information, icons and widgets of the computer device 10, and as an auxiliary input device for inputting user's operation commands, respectively.

Meanwhile, since each of the touch screens 131, 132 and 133 is located at the lower end of the key button unit 110, it is covered while the user uses the key buttons, and user's touching touch screens may result in executing programs not intended by the user.

Therefore, it is preferred to switch the touch screens to disable mode while the user uses key buttons. It is preferred to set at least the input function to stop, and even the display function to stop if required in the disable mode.

In an embodiment of the present disclosure, the sensor 140 is used to decide whether the user uses key buttons.

The sensor 140 is for selectively controlling operation of each of the touch screens 131, 132 and 133 by sensing user's hands to decide whether the user uses the key buttons. This is because, since it is inevitable that user's hands cover part of the touch screen unit 120 during input activity with the key buttons, it is preferred to temporarily stop the operation of covered touch screens or switch them to the disable mode.

The sensor 140 is laid out between the key button unit 110 and the touch screen unit 120 in the horizontal direction to sense user's hands located thereabove. The sensor 140 is not limited to a special type. For example, it may be any one of a photo sensor, ultrasound sensor, capacitive proximity sensor, or proximity sensor using induced magnetic forces.

The first to the third sensors 140a, 140b and 140c installed at the upper end of the first to the third touch screens 131, 132 and 133, respectively, allow the user to control the first to the third touch screens 131, 132 and 133 independently.

Figure 5:
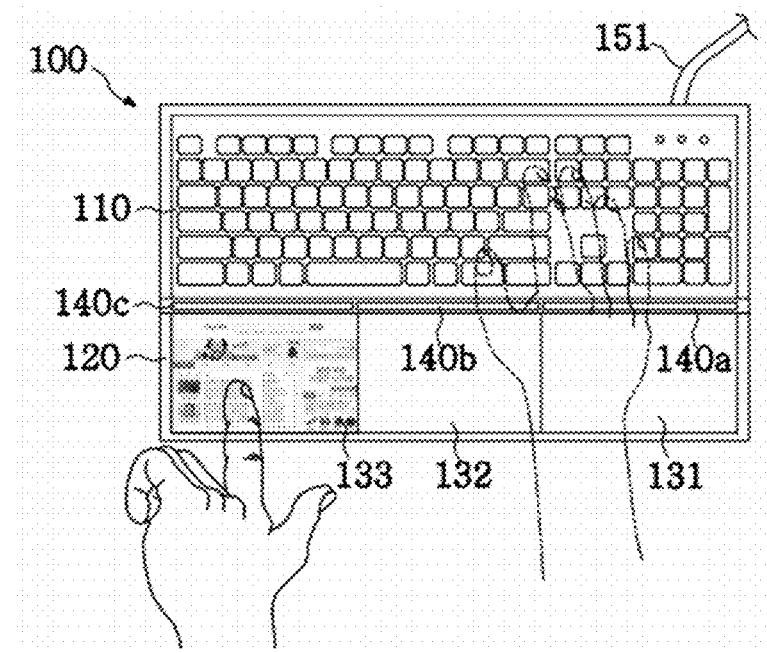
FIG. 5 illustrates touch screens controlled independently.

In this case, as illustrated in FIG. 5, when user's right hand operates the key button unit 110, the first and the second sensors 140a and 140b sense the right hand to switch both the first and the second touch screens 131 and 132 to the disable mode. However, since the third sensor 140c does not sense the hand, the third touch screen 133 may operate.

Figure 6:
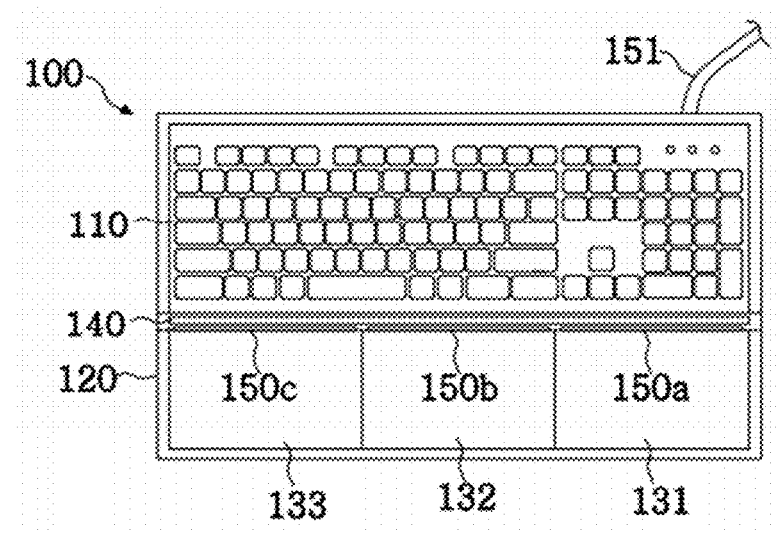
FIG. 6 shows light emitting units for status display installed close to each touch screen.

As described above, if each of the touch screens 131, 132 and 133 is controlled independently, light emitting units (LED) 150a, 150b and 150c for displaying the status may be formed close to each of the touch screens 131, 132 and 133 as shown in FIG. 6.

Each of the light emitting units 150a, 150b and 150c for status display may include at least one LED.

In addition, although it is preferred that each of the light emitting units 150a, 150b and 150c for status display is installed at the higher end of each of the touch screens 131, 132 and 133, their installation location or size is not limited to a specific location or size.

The aforementioned light emitting units 150a, 150b and 150c for status display may be set to emit, for example, green light while the corresponding touch screens 131, 132 and 133 are in operation, and red light in the disable mode.

In addition, if the computer display 14 and each of the touch screens 131, 132 and 133 are in power save mode or standby mode, the keyboard control unit 102 may control the light emitting units 150a, 150b and 150c for status display to make a specific LED blink, or the LED emit a different color after receiving a given signal from the computer device 10 when e-mails or text messages are received.

In addition, in a portable computer device 10, the light emitting units 150a, 150b and 150c for status display may be controlled to emit light according to a given scheme if its battery level is low.

Meanwhile, it is also possible to switch the covered touch screens 131, 132 and 133 automatically to the disable mode by sensing access by user's hands without using the sensor 140.

For example, the operation mode of each of the touch screens 131, 132 and 133 may be determined by sensing touching each of the touch screens 131, 132 and 133 by hands, or the operation mode of each of the touch screens 131, 132 and 133 may be determined by sensing input through the key buttons.

Exemplary specific methods are described below.

A first method is to use size of touch area on the touch screens. In general, while the touch area is relatively small because users use fingertips when operating the touch screens, the touch area is even larger if user's palms touch the touch screens 131, 132 and 133 when using the key buttons.

Therefore, the keyboard control unit 102 may consider the key buttons as being used by setting a reference touch area and comparing actual touch areas sensed from each of the first to the third touch screens 131, 132 and 133 with the reference touch area, and then switch the touch screens touched by the user's hands to the disable mode if the actual touch areas are larger than the reference touch area. In addition to the touch area, touch time may be considered to switch the touch screens to the disable mode, provided that touching the touch screens continues for a period longer than a time setting.

It is essential to decide the touch area on the touch screens by user's hands to implement the function. To this end, it is essential to use touch screens capable of recognizing multiple touches. An exemplary touch screen capable of recognizing multiple touches may be a matrix-type touch screen in which, for example, a plurality of first electrodes in the x-axis direction are spaced from a plurality of second electrodes in the y-axis direction. In this case, after inputting high-speed scanning signals into, for example, the plurality of first electrodes in sequence, touching the first electrodes and the second electrodes or changes of capacitance between them may be decided when signals outputted from each of the plurality of second electrodes are detected. As a result, all coordinates of locations pressed by user's hands may be detected.

A second method is to install special pressure sensors below or close to each of the first to the third touch screens 131, 132 and 133 to consider the key buttons as being used when a pressure higher than a pressure setting is detected, to switch a concerned touch screen to the disable mode. Likewise, even in this case, the mode may be switched if a pressure higher than the pressure setting continues for a period longer than a time setting. Mode switching based on assize of touch area or a touch pressure enables the mode of the first to the third touch screens 131, 132 and 133 to be switched independently.

A third method is to switch mode based on input through key buttons. That is, if input through key buttons continues for a period longer than a time setting, it may be considered that the key buttons are being used to switch a concerned touch screen among the first to the third touch screens 131, 132 and 133 to the disable mode.

Meanwhile, when any touch screen is switched to the disable mode by user's using key buttons, the keyboard control unit 102 may consider the concerned touch screen as being covered by user's hands, and then send the screen data displayed on the concerned touch screen to the computer device 10 to display the data on the computer display 14.

For example, the screen of the touch screen switched to the disable mode may be displayed after displaying a popup window on part of the computer display 14.

Meanwhile, the computer device 10 to which the keyboard 100 in accordance with an embodiment of the present disclosure is connected includes a computer control unit 12 for controlling overall operation, a computer display 14, and a storage unit 16 for storing programs and information like an ordinary computer as shown in FIG. 2.

The keyboard 100 may be connected to the body of the computer device 10 by means of a connection cable 151, or through wireless communication, for example, Bluetooth. Meanwhile, the computer device 10 is not limited to a desktop computer shown in FIG. 3, and may be a portable computer device 10 shown in FIG. 7. Examples of the portable computer device 10 described above include portable electronic devices that may function as a computer, for example, tablet PCs, smartphones, PDAs, PMPs, or electronic diaries.

Figure 8:
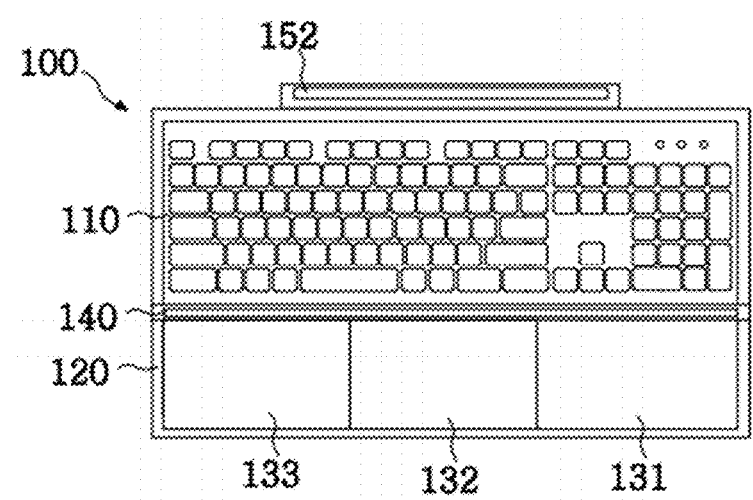
FIG. 8 shows a keyboard in accordance with another embodiment of the present disclosure.

The portable computer device 10 may also be connected to the keyboard 100 in accordance with an embodiment of the present disclosure by means of a connection cable. However, it is preferred to install a docking port 152 in the keyboard 100 for placing the portable computer device 10 thereon as shown in FIG. 8 for convenient use. It is essential that the docking port 152 is equipped with a communication terminal to be connected to the communication port of the portable computer device 10.

The operation of the keyboard 100 in accordance with an embodiment of the present disclosure is described hereinafter.

First, when power is applied to the computer device 10, an ordinary background is displayed on the computer display 14 while the keyboard control unit 102 turns ON the first to the third touch screens 131, 132 and 133 to display a set screen after receiving a given signal from the computer device 10 or sensing power application.

It is preferred to set the screen displayed on each of the touch screens 131, 132 and 133 as one required by the user.

Setting the screen of each of the touch screens 131, 132 and 133 may be performed in each of the touch screens 131, 132 and 133. For example, in the first touch screen 131 specified as a main touch screen, the screen mode of the first and the third touch screens 131 and 133 may be set, respectively.

For convenient description, the following description is based on the case of setting the screen mode of each of the touch screens 131, 132 and 133, respectively.

Figure 9:
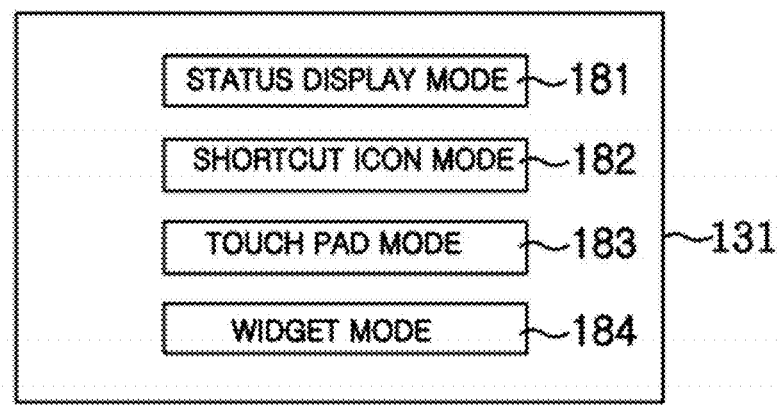
FIG. 9 illustrates a mode selection screen.

First, the keyboard control unit 102 displays a mode selection screen illustrated in FIG. 9 in each of the touch screens 131, 132 and 133 after turning ON each of the touch screens 131, 132 and 133.

The mode selection screen displays a plurality of mode selection menus, for example, status display mode 181, shortcut icon mode 182, touch pad mode 183 and widget mode 184. It should be noted that the mode selection menus are not limited to those illustrated above.

For example, the first touch screen 131 may be set to be in status display mode 181, the second touch screen 132 to be in shortcut icon mode 182 and the third touch screen 133 to be in touch pad mode 183 as the user sets them, and they may be changed to different screen mode if required.

Figure 10:
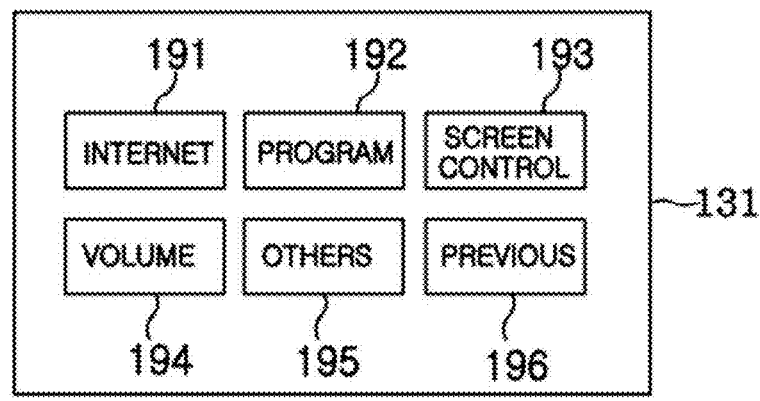
FIG. 10 illustrates a screen when status display mode is selected.

The status display mode 181 is a screen mode for checking status information of the computer device 10. When the status display mode 181 is selected, various sub menus including the Internet 191, program 192, screen control 193, volume setup 194, others 195, and previous 196 are displayed on the concerned touch screen as illustrated in FIG. 10. Selecting one from the sub menus results in executing each corresponding program.

It should be noted that the mode selection menus and the sub menus may be displayed as icons, not text type.

For example, selecting the Internet menu 191 from the sub menus may result in displaying Internet and/or network connection status as a graphic image or text on the screen.

In addition, selecting the program menu 192 may result in displaying information about, for example, a startup program or an execution program on the screen.

In addition, selecting the screen control menu 193 may result in displaying the screen for controlling the screen to customize brightness or colors. In this case, it is preferred that the screen control function is applied to the screen of the first to the third touch screens 131, 132 and 133 mounted on the keyboard 100 as well as the screen of the computer display 14.

Specifically, it may be set that the screen setup condition inputted through the screen for controlling the screens is concurrently applied to the computer display 14 and the first to the third touch screens 131, 132 and 133, or the user selects any one from the computer display 14 and the first to the third touch screens 131, 132 and 133 to control the screens.

Meanwhile, since each of the touch screens 131, 132 and 133 is limited in terms of screen size, it may be set that the screen displayed on each of the first to the third touch screens 131, 132 and 133 is displayed on the computer display 14 if required. On the contrary, it may also be set that the screen executed on the computer display 14 is displayed on any one of the first to the third touch screens 131, 132 and 133.

The previous menu 196 shown in FIG. 10 is a menu for returning to the previous screen, that is, the mode selection screen of FIG. 9. The previous menu 196 may also be displayed on the screen of the shortcut icon mode, the touch pad mode and the widget mode as well as the screen of the status display mode.

Referring to FIG. 9 again, the shortcut icon mode 182 displays execution icons of major programs frequently used on the screen of the touch screens 131, 132 and 133 like the background of the computer display 14.

Therefore, when an execution icon displayed on the touch screens 131, 132 and 133 is selected, the keyboard control unit 102 sends a given signal to the computer device 10, and the computer control unit 12 executes corresponding program and outputs it through the computer display 14. A specific execution icon may be set to be added and removed by the user after selecting the shortcut icon mode 182.

Selecting a touch screen always visible to the user while using key buttons among the plurality of touch screens 131, 132 and 133 and setting the selected touch screen to the shortcut icon mode 182 have the following advantage. That is, the user may touch, for example, a required execution icon on the touch screen to execute the program linked to the concerned icon instantly without returning to the background while editing a document on the computer display 14 to result in greatly enhanced convenience of use.

The touch pad mode 183 is a mode used as a pointing device for moving a pointer displayed on the computer display 14, or an input device for editing a document or inputting characters or figures by means of user's hands or a touch pen on a graphic application executed on the computer display 14.

Figure 11:
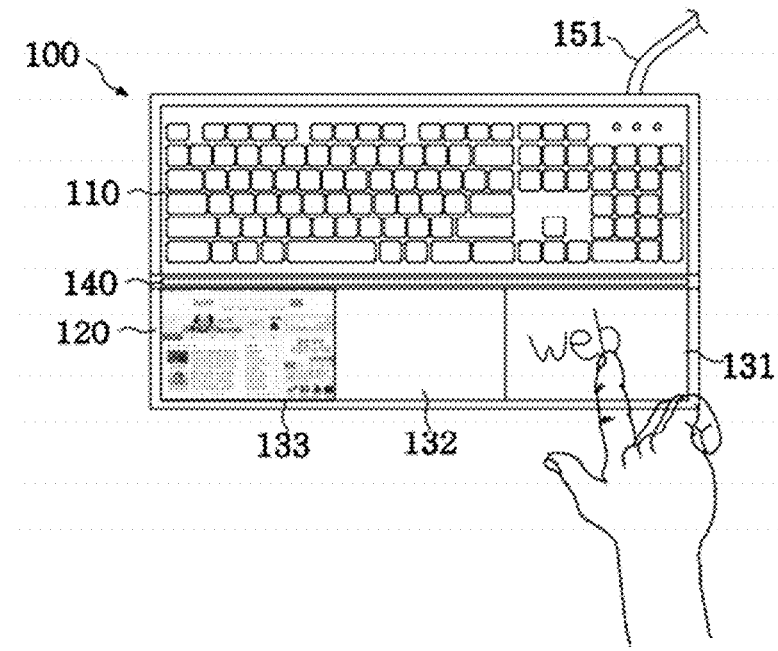
FIG. 11 shows the status of inputting a command in touch pad mode.

It may also be set that a corresponding program is executed when the user inputs a specific character in the touch pad mode 183. For example, as shown in FIG. 11, when the user writes web on the first touch screen 131 set to be in the touch pad mode 183, the keyboard control unit 102 may recognize and then analyze the inputted pattern to send a concerned command to the computer device 10 in order to execute a corresponding program (for example, web browser) if the pattern matches a command registered in advance. In this case, the command inputted by the user is not limited to characters, and numbers or symbols may also be used as a command.

Figure 12:
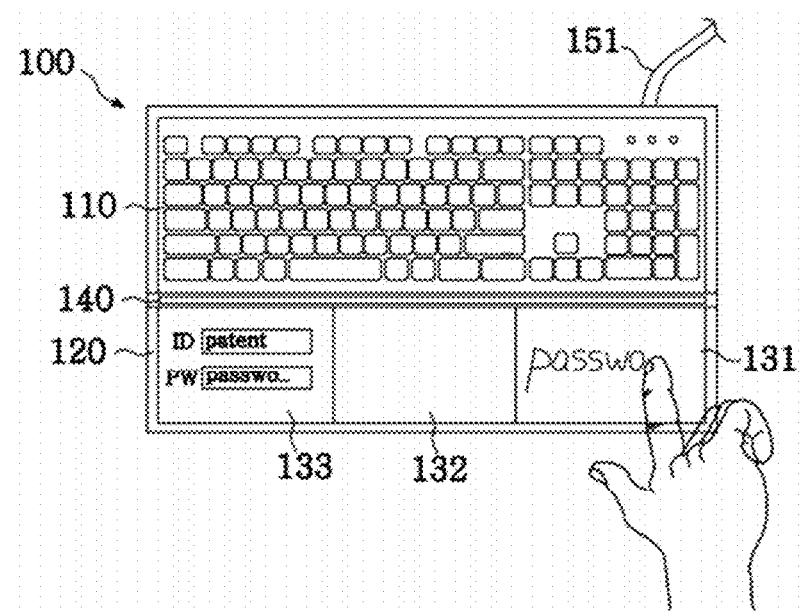
FIG. 12 shows unlocking a computer in touch pad mode.

In addition, users generally input a password through a keyboard to activate their locked computer device 10. Using the keyboard 100 in accordance with the present disclosure enables users to write and input the password on the touch screen 131 set to be in the touch pad mode 183 as shown in FIG. 12 to result in enhanced convenience of use.

That is, the keyboard control unit 102 may recognize and analyze the pattern inputted by user's hands on the touch screen 131, and then send the inputted pattern to the computer device 10. Subsequently, the computer device 10 may also compare the pattern with the information registered in advance and switch the locked status to operation status when they match each other. In this case, the user may input a signature registered in advance without inputting characters, numbers or symbols.

The widget mode 184 is a mode for displaying various types of widgets provided in Internet portal sites or by web servers on the touch screens 131, 132 and 133. Conventionally, since widgets are just displayed on the background of the computer display 14, it is thus necessary to close and switch the screen for editing a document to the background in order to check widget information while the screen for editing a document is displayed.

Therefore, if the widgets are displayed on the touch screens 131, 132 and 133 always visible to the user, the user may check required weather information, stock information, news, e-mail information or blog information in real time.

Figure 13:
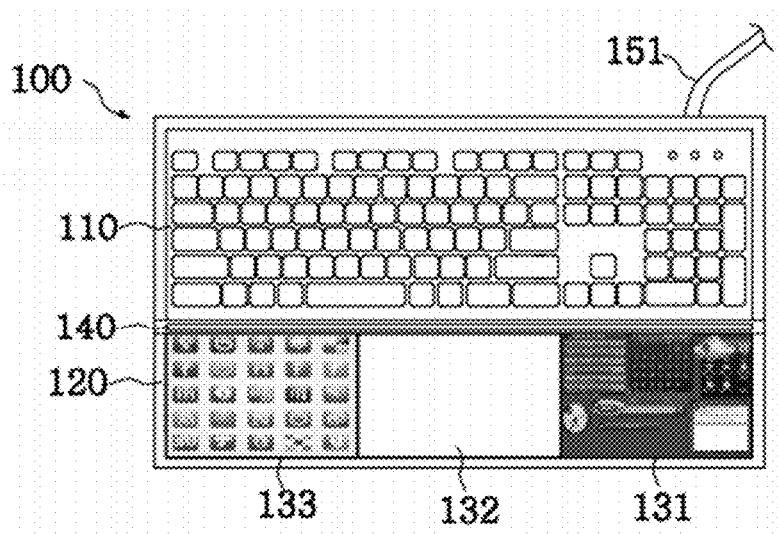
FIG. 13 illustrates each touch screen set to be in shortcut icon mode, touch pad mode and widget mode, respectively.

FIG. 13 illustrates a case of the first touch screen 131 set to be in the widget mode, the second touch screen 132 in the touch pad mode, and the third touch screen 133 in the shortcut icon mode.

In addition to the aforementioned operation modes, it may also be set that a popup window of a concerned program is displayed on any one of the first to the third touch screens 131, 132 and 133 when the user executes a messenger program commonly used recently or an audio play program.

Meanwhile, for example, convenience of use may be further enhanced by allowing the mode selection screen or a sub menu screen set for the first touch screen 131 to be moved to other touch screens 132 and 133.

In this case, a screen movement menu may also be specially laid out on the first touch screen 131, and the entire screen of the first touch screen 131 may be moved to the neighboring second touch screen 132 through touch and drag.

Figure 14:
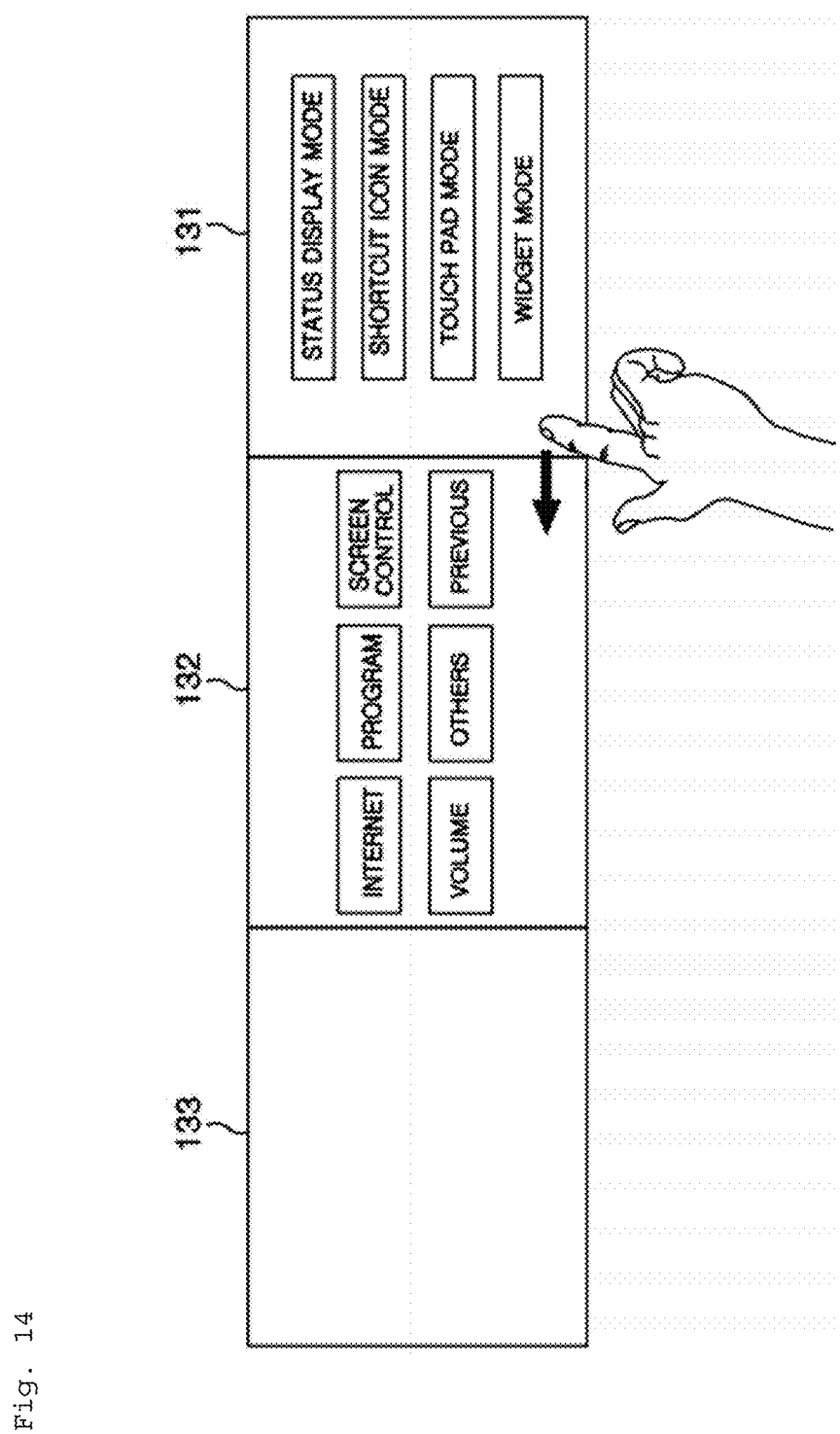
FIG. 14 illustrates an operation mode screen moved from one touch screen to another touch screen.

FIG. 14 illustrates the aforementioned process. The user touches the first touch screen 131 by user's hand to drag it to the left in order to move the status display mode screen displayed on the first touch screen 131 to the second touch screen 132 on the left. In this case, the mode selection screen shown in FIG. 9 is automatically displayed on the first touch screen 131.

Therefore, the user may select another mode again on the first touch screen 131.

In addition, the user may move the status display mode screen on the second touch screen 132 to the third touch screen 133 on the left side through touch and drag. In this case, it is also preferred that the status display mode screen on the second touch screen 132 is switched again to the mode selection screen.

Meanwhile, screens of the touch screens 131, 132 and 133 may be moved between them each other, and the screen displayed on each of the touch screens 131, 132 and 133 may be moved to the computer display 14. This may also be carried out by selecting the screen movement menu displayed on the touch screens 131, 132 and 133, or through touch and drag described above.

Figure 15:
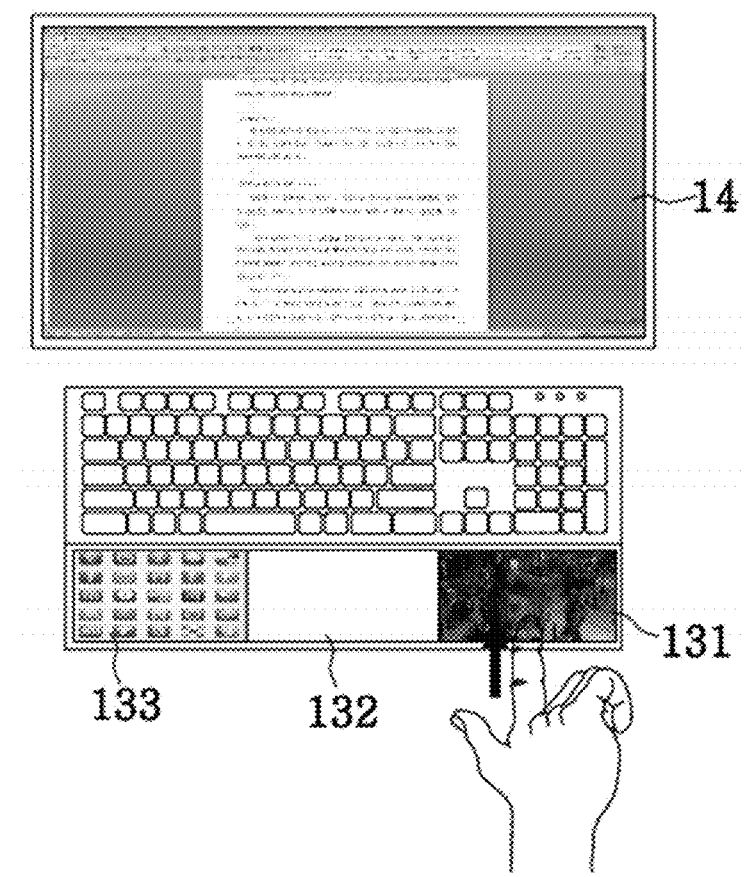
FIGS. 15 and 16 illustrate a screen moved from a touch screen to a computer display in sequence.
Figure 16:
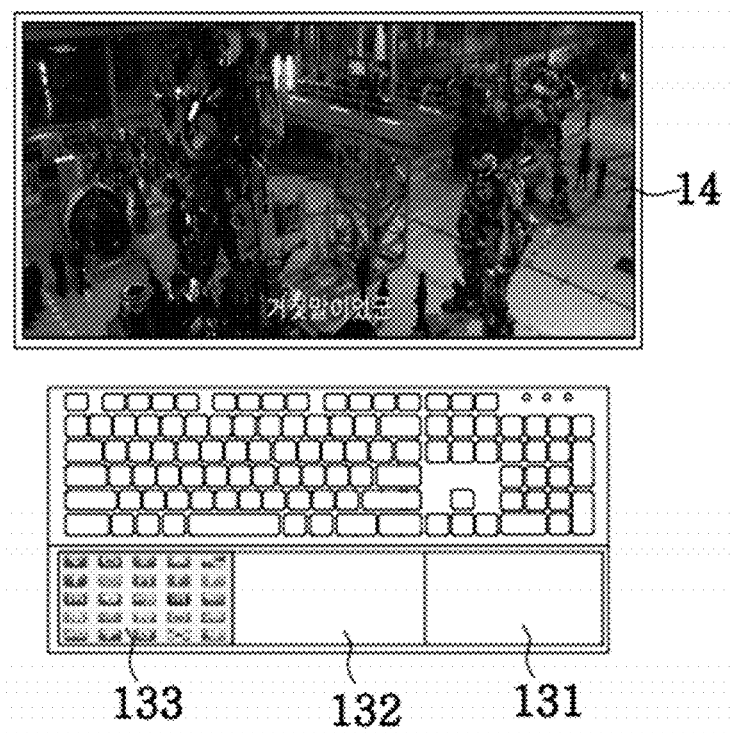

FIGS. 15 and 16 illustrate the screen movement through touch and drag, showing the user touches the first touch screen 131 by hands to touch and drag the first touch screen 131 from bottom to top. Subsequently, the keyboard control unit 102 sends the screen data displayed on the first touch screen 131 to the computer device 10, and the computer control unit 12 displays the received screen data on the computer display 14 as shown in FIG. 15. It is preferred that the mode selection screen or a specially set mode screen is displayed on the first touch screen 131 after screen movement.

On the contrary, for example, when the user places hands on the first touch screen 131 to touch and drag the screen thereof from top to bottom, the computer control unit 12 may send the screen data displayed on the computer display 14 to the keyboard 100 and the keyboard control unit 102 may also display the received screen data on the first touch screen 131. Since screen movement between the computer display 14 and a touch screen is not limited to the first touch screen 131, it should be noted that it may be applied to other touch screens 132 and 133. The screen movement and switching described above is implemented by interworking between the computer control unit 12 and the keyboard control unit 102. This enables the first to the third touch screens 131, 132 and 133 to operate in each different mode, respectively, and allows screen movement between each of the touch screens 131, 132 and 133 and the computer display 14. Therefore, a GUI (Graphic User Interface) even more diversified and convenient in comparison with conventional computers may be provided.

Meanwhile, although the above description is based on the assumption that three touch screens 131, 132 and 133 are mounted in the touch screen unit 120, the number of the touch screens 131, 132 and 133 is not limited thereto. Therefore, one single touch screen may be used.

While the embodiments of the present disclosure are described above, the present disclosure is not limited to the embodiments described above, and may be modified and changed in various ways. It should be noted that the changes and modifications of the embodiments are deemed to be covered by the present disclosure, provided that they include the technical idea of the present disclosure that is limited only by the following claims.

DESCRIPTION OF NUMERALS

10: computer device 12: computer control unit
14: computer display 16: computer storage unit
100: keyboard 102: keyboard control unit
110: key button unit 120: touch screen unit
131, 132, 133, 134, 135: first, second, third, fourth, fifth touch screen
140: sensor 151: connection cable
152: docking port
150a, 150b, 150c: first, second, third light emitting unit for status display
160: keyboard storage unit

The invention claimed is:

1. A keyboard comprising:
a key button unit comprising a plurality of key buttons;
a touch screen unit comprising at least one touch screen installed at a lower end of the key button unit;
a sensing means for sensing whether the key button unit is being used; and
a keyboard control unit for sending signals inputted through the key button unit or the touch screen unit to a computer device, interworking with the sensing means and a keyboard storage unit to control input or output of the touch screen unit, and enabling or disabling input to the touch screen unit by determining whether the key button unit is being used,
wherein the touch screen unit comprises a plurality of screen areas controlled independently to each other,
wherein the sensing means comprises a plurality of sensors installed to correspond to the plurality of screen areas,
wherein the keyboard control unit, in response to a sensor, among the plurality of sensors, sensing a hand of a user covering at least a part of a screen area of the plurality of screens areas, determines that the key button unit is being used by the user, disables the screen area of the plurality of screen areas, and transfers a screen displayed on the screen area of the plurality of screen areas to the computer device to be displayed on a display of the computer device,
wherein the keyboard storage unit stores programs required for operating the keyboard control unit, and
wherein the keyboard comprises a plurality of light emitting units installed adjacent to the plurality of the screen areas, respectively, each of the plurality of light emitting units indicating an operation status of a corresponding screen area of the plurality of screen areas.

2. The keyboard of claim 1, wherein the plurality of sensors include a proximity sensor installed between the key button unit and the touch screen unit in a horizontal direction.

3. The keyboard of claim 1, wherein the touch screen operates in any one mode selected from a plurality of operation modes, and the plurality of operation modes comprise at least two modes selected from:
a status display mode for displaying a status of a connected computer device;
a shortcut icon mode for displaying a plurality of execution icons;
a touch pad mode for sensing the user's touch to carry out functions of a pointing device and an input device; and
a widget mode for displaying information provided through the Internet network.

4. The keyboard of claim 1, wherein the keyboard control unit determines whether the key button unit is being used by setting a pre-determined reference touch area and comparing actual touch areas sensed from the touch screen unit and disables the touch screen unit if the actual touch areas are larger than the reference touch area.

5. The keyboard of claim 1, wherein the sensing means comprise pressure sensors installed within proximity of the touch screen, wherein the pressure sensors communicate pressure information to the keyboard control unit, wherein the keyboard control unit disables the touch screen unit when pressure applied by the user to the touch screen is higher than a pre-determined pressure for a period of time that is longer than a pre-determined time period.

6. The keyboard of claim 1, wherein the keyboard control unit disables the touch screen unit when input is received by key buttons of the plurality of key buttons.

7. The keyboard of claim 1, wherein the keyboard control unit disables the touch screen unit when input is received by key buttons of the plurality of key buttons for a period of time that is longer than a pre-determined time period.

8. The keyboard of claim 1, wherein the plurality of sensors comprise a first sensor, a second sensor, and a third sensor and the touch screen unit comprises three touch screens, wherein each sensor of the first to third sensors corresponds to one of the three touch screens and each touch screen of the three touch screens is disabled when the respective sensor of the first to third sensors senses the user's hand and each touch screen of the three touch screens is enabled when the respective sensor does not sense the user's hand.

9. A method of controlling operation of a keyboard comprising:
- a key button unit comprising a plurality of key buttons;
- a touch screen unit comprising at least one touch screen installed at a lower end of the key button unit;
- a sensing means for sensing whether the key button unit is being used; and
- a keyboard control unit for sending signals inputted through the key button unit or the touch screen unit to a computer device, and interworking with the sensing means and a keyboard storage unit, which stores programs required to operate the keyboard control unit, to control input or output of the touch screen unit, wherein the touch screen unit comprises a plurality of screen areas controlled independently to each other, wherein the sensing means comprises a plurality of sensors installed to correspond to the plurality of screen areas, and wherein the keyboard comprises a plurality of light emitting units installed adjacent to the plurality of the screen areas, respectively, the method comprising:
- driving the touch screen unit;
- sensing, by a sensor of the plurality of sensors, a hand of a user covering at least a part of a screen area of the plurality of screens areas;
- in response to the sensor sensing the hand of the user covering at least the part of the screen area, determining that the key button unit is being used by the user, disabling the screen area of the plurality of screen areas, and transferring a screen displayed on the screen area of the plurality of screen areas to the computer device to be displayed on a display of the computer device; and
- controlling each of the plurality of light emitting units to indicate an operation status of a corresponding screen area of the plurality of screen areas.

10. The method of claim 9, wherein the plurality of sensors comprise a proximity sensor installed between the key button unit and the touch screen unit.

11. The method of claim 9, wherein it is determined that the key button unit is being used when a touch area on the touch screen is larger than a reference touch area.

* * * * *